METHOD OF MAKING A THERMOPILE

Filed Nov. 9, 1962 3 Sheets-Sheet 1

INVENTOR.
DAVIS T. BRECKENRIDGE
BY
Brown, Critchlow, Flick & Peckham.
ATTORNEYS.

Feb. 21, 1967 D. T. BRECKENRIDGE 3,305,393

METHOD OF MAKING A THERMOPILE

Filed Nov. 9, 1962 3 Sheets-Sheet 2

INVENTOR.
DAVIS T. BRECKENRIDGE

BY

Brown, Critchlow, Flick & Peckham.
ATTORNEYS.

INVENTOR
DAVIS T. BRECKENRIDGE
BY
Brown, Critchlow, Flick & Peckham.
ATTORNEYS.

United States Patent Office 3,305,393
Patented Feb. 21, 1967

3,305,393
METHOD OF MAKING A THERMOPILE

Davis T. Breckenridge, Lutherville, Md., assignor to Catalyst Research Corporation, Baltimore, Md., a corporation of Maryland Filed Nov. 9, 1962, Ser. No. 236,512
1 Claim. (Cl. 117—212)

This invention relates to a method, as well as products thereby obtained, by which multiple circuits are provided that can be used for the direct conversion of thermal energy into electrical energy or the conversion of electrical energy directly into thermal energy.

There is considerable current interest in thermoelectric converters. By the use of such devices, thermal energy may be converted into electrical energy by the application to the thermocouple junctions of heating or cooling effects or both. Similarly, the conversion of electrical energy into thermal energy is possible with the same structure by applying an electric potential to the thermocouples whereby their temperature is caused to rise or fall. The former of these phenomena is known as the Seebeck effect and the latter the Peltier effect.

The outputs generated by thermocouples vary according to the materials used, but characteristically are low. Accordingly, any appreciable effect achieved is accomplished by connecting many thermocouples in series, thereby defining a thermopile. The absence of moving parts in these devices and their ability to bring about direct conversions between thermal and electrical energy make these structures of particular interest since they are of broad application and provide trouble-free operation. It is a primary object of the present invention to provide a process whereby thermoelectric converter circuits comprising a large number of thermocouples in series connection are provided in a simple, easily practiced method with a minimum of trouble and contamination and with readily available materials and techniques.

Another object of the invention is to provide structurally novel thermopiles characterized by greater reliability and improved ruggedness than has been had heretofore.

Other objects will be apparent upon consideration of the following detailed discussion, the drawings and description.

Prior to the present invention, thermopiles comprising a plurality or series connected thermocouples have been prepared in which a carrier for the thermocouples has been masked, first to permit the deposition of one of the materials of the thermocouple, and then masked to protect that already applied and to permit the application of the second material. Such masks characteristically have been thin and fragile and are difficult to produce. Moreover, the thermocouple materials have been applied by painting, printing, etching techniques, vacuum deposition and the like and such practices have tended to adversely affect the film-like masks that have been used. Thus, though such masks assure an accurate device, the techniques used have made the production process and products obtained unduly complex and expensive.

These and other problems are avoided in accordance with the present invention and a simple process resulting in structurally superior products has now been devised. In accordance with the present discoveries, a plurality of series connected thermocouple junctions are provided within grooves or depressions in the carrier substrate resulting in a thermopile in which the active portions are physically protected and therefore provide greater trouble-free operation. The deposition of these materials is accomplished by any available technique while masking or physically isolating relatively large areas of the substrate and, conversely, exposing relatively large areas. This results in an application of each of the materials over a substantial portion of the substrate in addition to within the grooves or depressions that are exposed. However, the metal on the substrate surface does not result in electrical shorting or locations of physical weakness since that metal is removed, as by abrasion or similar techniques, leaving no more than the physically produced circuit of a series of junctions that exist within the depressions. In this simple manner, a product is readily obtained and is produced in such fashion that the reliability of it is vastly improved over that heretofore obtained. Suprisingly, this outstanding result is achieved through the use of processing steps that, compared with prior practices, are of greater simplicity and seemingly productive of less accurate products.

Considered broadly, the invention comprises the steps of masking a suitable substrate to expose selected, large portions of a groove therein in such a fashion that the first deposition of metal that is to occur will provide alternating filled and unfilled sections, applying the first metal to the substrate at its exposed areas, then masking the zones in which metal has already been deposited, depositing a different metal on the exposed areas and then removing all metal that has not been deposited in a groove. The terms "masking," "depositing," and the like are used in their broad sense. For example, where a groove extends to two major sides of a substrate as in the use of a flat rectangular substrate with a helical groove, the exposure of one side at a time constitutes masking, in the sense of this invention, of the unexposed side even though no physical structure may be applied to cover or protect the side where deposition is not to occur. Generally, the steps of the process are carried out in order given, but in instances the order may be varied. For example, when making a thermopile with the different metals on different surfaces, surface cleaning of one side may be practiced before deposition of metal on the other side is carried out.

An important advantage of the use of a grooved substrate in accordance with the present invention is the simplicity it introduces into processing. Heretofore, finely detailed masks or tedious etching techniques or the like have been used in order to define a single conductive path including a plurality of thermocouples and an absence of shorts. With a grooved substrate as in this invention, on the other hand, only rough masking of the substrate is needed. This exposes about one half of the substrate at a time, and those parts are exposed as large areas or large segments rather than as fine lines. After deposition of the first metal, the mask is moved to its second position and the second metal is deposited resulting in the substrate being coated with a pattern of two metals. The mask is then removed and all metal deposited on the surfaces, as distinguished from the grooves, is removed as by a simple abrading process. There remains that metal that is within the grooves and therefore that has been unaffected by the abrading process. In this simple manner, effective devices that have high reliability are produced readily.

Any two metals in the thermoelectric series can be used in producing thermocouples in accordance with the present invention. It is within the invention also to use the semiconductor materials that are presently considered for applications of this type, and the term "metal" as used herein should be understood to include semiconductor materials. While the invention in its specific embodiments will be described hereinafter with respect to Nichrome and bismuth, it will be apparent that any other metal pair may be used as well. However, one of the advantages of the present invention is that it provides the ability to produce a great number of uniform junctions whereby the cumulative effect of the individual junctions is added to one another to produce a given result. Thus, the present practice of attempting to find thermocouple pairs having a greater individual effect than heretofore need not be followed, though, of course, such materials can be used if desired.

The shape of the substrate that is used in accordance with the teachings of this invention is not critical though the shape chosen may be influenced by each intended application. Typical shapes among those that can be used are flat circular shapes such as discs, parallelepipeds in general, a cylindrical shape such as a hollow tube and the like. Whatever shape is used, it is essential that it be grooved to receive metals that serve as the active components. The essential physical characteristic of devices of this invention that distinguishes them from previous devices and by which their outstanding advantages are achieved is the fact that the conductive parts are located below the surface of the substrate. Consistent with the foregoing requirement and the further consideration that the substrates must be both electrical and thermal insulators, for purposes of avoiding shorting and avoiding the equalization of temperature of "hot" and "cold" junctions, substrates of any desired material can be used. The wide variety of materials available for substrates provides essentially limitless flexibility as to the operating temperatures that may be encountered by devices of the invention without failing. Typical of the materials that can be used for this purpose are the Plexiglass, linear polyurethanes, polyamides, polyethylene, polypropylene, polystyrene, polyvinyl acetate, polyvinyl chloride and so on. Such materials are widely available commercially, and the manner of their preparation and properties are universally available in company brochures and the technical literature. Thermosetting resins, glasses, ceramics and the like can also be used if desired.

The metals can be applied to the substrate by a wide variety of techniques known to the art, for example, by painting, evaporation, sputtering, chemical plating, flame spraying, printing, vacuum deposition and the like. The conditions under which the metals are applied obviously vary according to the techniques and materials used. By way of example, painting can be effected at room temperature while vacuum deposition requires that the metals be held above their evaporation temperatures and the substrate below that temperature as well as below its own fusion temperature. The choice of suitable operating conditions is well within the skill of the artisan considering the characteristics of the substrate and metals to be used.

The removal of the metal deposited indiscriminately on the substrate surfaces is a simple mechanical process. Burnishing, sanding, cutting, and the like have been used effectively, and any other technique can be used as well. The fact that the useful metal is within the grooves protects it during this operation. Of course, the groove depth is chosen so that the metal deposited therein to a level not removed during the burnishing, cutting or sanding operations, will provide the desired electrical resistance for the resulting structure.

Reference may now be had to the attached drawings showing several embodiments of structures of the invention along with several stages of development of one embodiment and in which.

Figure 1:
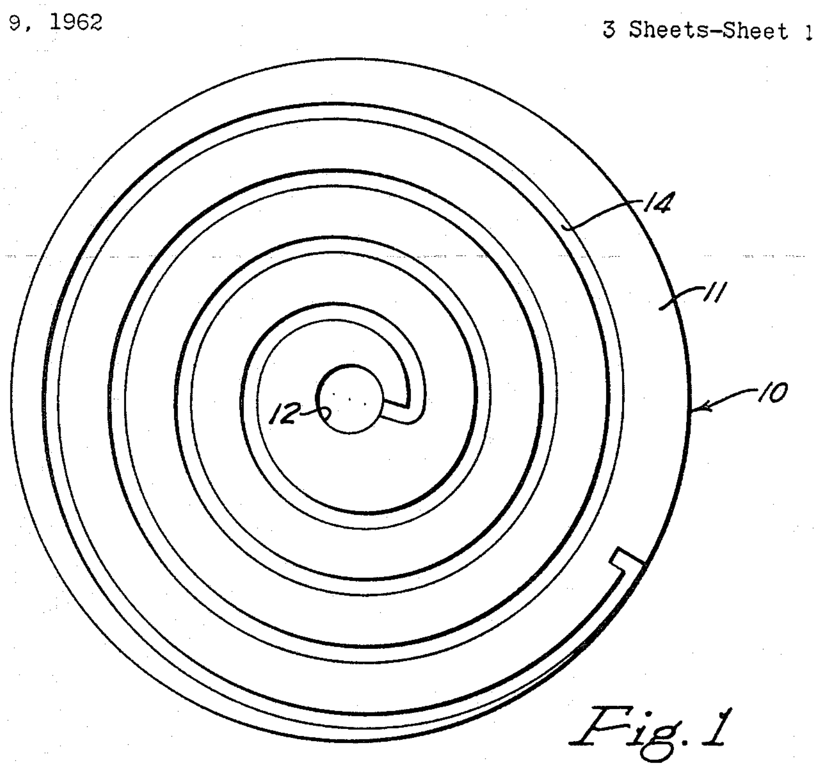
FIG. 1 is a top plan view of a disc-shaped substrate having a spiral groove for use in this invention.
Figure 2:
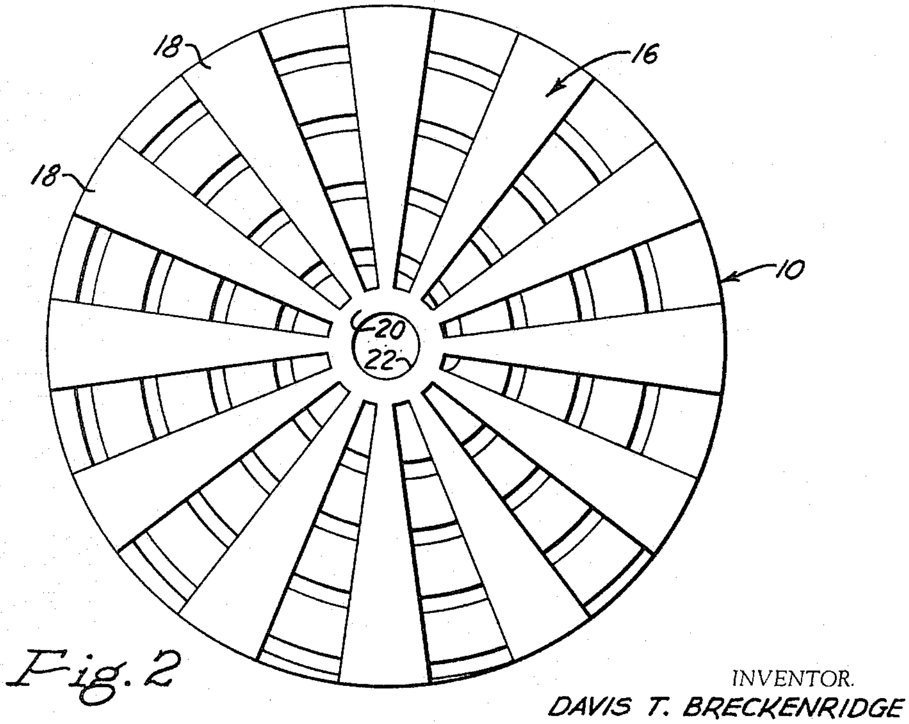
FIG. 2 shows the substrate of FIG. 1 with a mask on its grooved surface.

Referring to FIG. 1, there is shown a substrate 10 suitably composed of a dielectric material which is also a poor thermal conductor, e.g. Plexiglas or the like. Spirally throughout its top surface 11 from its central aperture 12 to its periphery is a groove 14. In preparing a spiral thermopile, the substrate is first covered with a suitable mask 16 such as is shown on the grooved substrate 10 in FIG. 2. The mask 16 is composed of a plurality of segments 18 radially supported at the central hub 20 which has a central aperture 22 of a size similar to aperture 12 in the substrate. The segments of the mask are narrower than the spaces between them to provide for overlapping of the deposited coatings. The mask 16 is rigidly held to the substrate 10 by a nut and bolt unit (not shown) through the mating apertures. With the mask in position, a first metal is deposited over the surface of the mask-substrate combination and fills the exposed portions of the groove, the ungrooved exposed surface of the substrate and the faces of the segments 18 of the mask.

Figures 3, 4, 5:
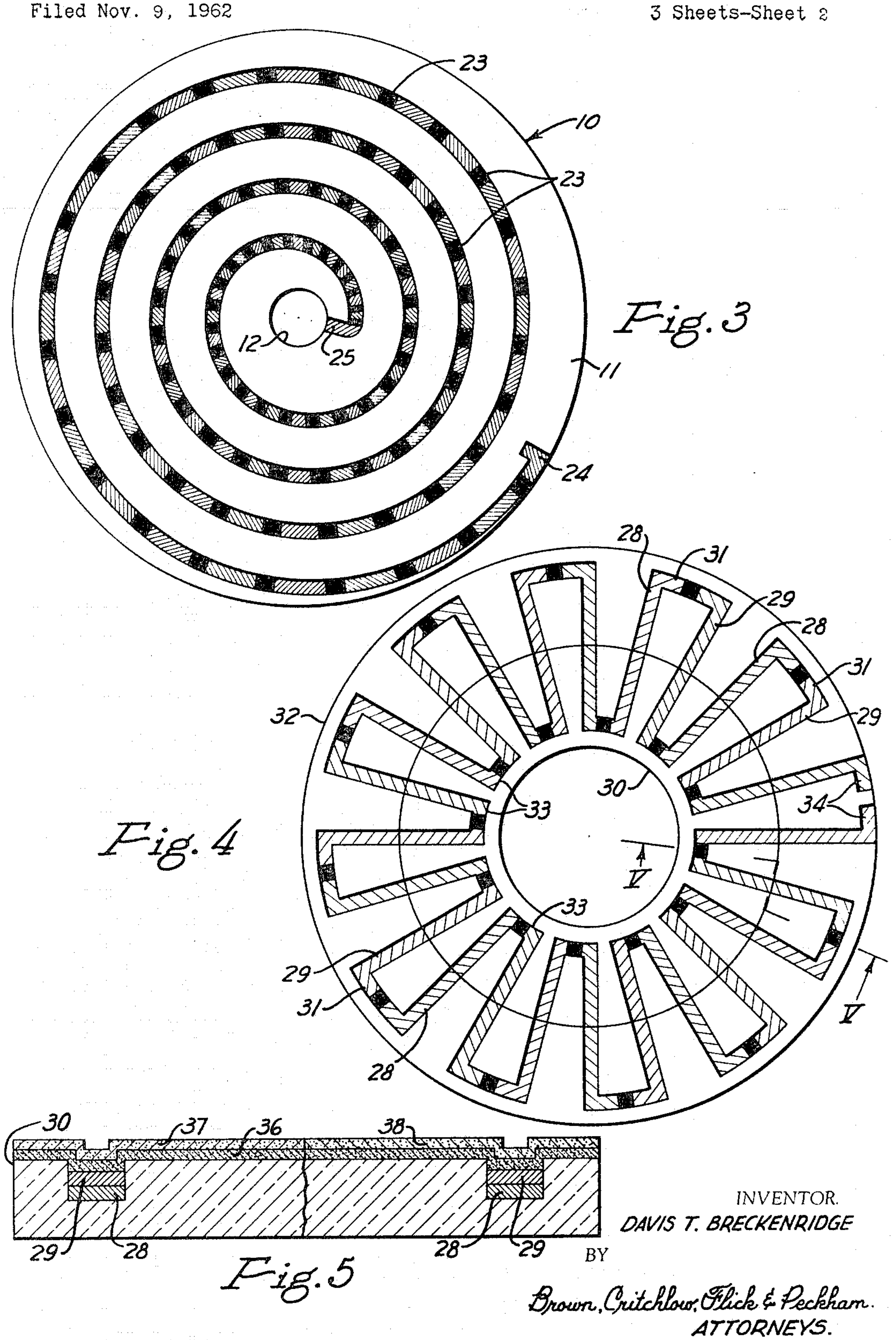
FIG. 3 is another top plan view of the substrate of FIG. 1 showing a large number of thermocouples in the spiral groove.
FIG. 4 is a top plan view of a second disc-shaped thermopile of the invention in which the junctions are specifically aligned in a second configuration.
FIG. 5 is a view taken along line V—V of FIG. 4.

Thereupon the mask 16 is moved to a position such that the sectors of mask 16 are centered over the wider, previously deposited sectors of the first metal. The open portions of the mask thus expose for the second deposit the areas of the substrate previously masked and also narrow sectors of the first deposit. After the deposition of the second material, these narrow sectors of the substrate coated with both deposits form the junctions 23 between the thermoelectric elements. At this point, the mask is removed. The number of junctions that are produced depends on the number of segments used and the length of the groove. At this point, the surface 11 of substrate 10 is sanded, scraped or the like, sufficiently such that all metal on the surfaces, as distinguished from the groove, is removed and the resulting product appears as is shown in FIG. 3. Leads can then be applied at the peripheral terminus 24 as well as the internal terminus 25 at the central aperture 12 of the substrate. This device can be used as such or refinements can be made in it, as will be apparent in discussing the other drawings, whereby its utility can be increased.

Referring to FIGS. 4 and 5, there is shown a second embodiment of disc shaped thermopile in accordance with this invention. In this embodiment, the shape of the groove defines a plurality of segmented areas made by the use of a large even number of radial grooves 28 and 29 that begin in the substrate just beyond the central aperture 30 and end near the periphery 32 of the substrate. All but one pair of grooves 28 and 29 is connected by a groove segment 31 near the periphery. The remaining pair is permitted to remain separate at the substrate periphery for purposes of attaching leads. The groove is made continuous by segments 33 joining adjacent legs 29 and 28 of two pairs of loop-shaped grooves at the edge of the central aperture 30. By using a mask such as is shown on FIG. 2, located so that the right edge of each segment crosses the groove through the segments 33 and the other edge of the mask segments cuts the groove in the segments 31 near the periphery 32 of the substrate, this pattern can be developed. Of course, after the first metal deposition has occurred, the mask is moved to expose the groove and surface where deposition did not occur in the first step. Consequently, every other junction of the two metals occurs in the outer segments 31 and the remaining junctions are located in the inner segments 33. Leads can be attached to the two ends of the groove where the pair of radial grooves is not closed by a peripheral segment, as at 34 in the drawing.

The embodiment of FIGS. 4 and 5 is particularly useful in generating an electric current since the "hot" and "cold" junctions are far removed from one another. For such applications, it is advantageous to first coat the entire groove surface, after metal deposition and surface cleaning, with a clear lacquer 36 that helps protect the metal in the grooves. Then the "hot" junctions are coated with an absorbing material such as a black lacquer 37 and the remaining or "cold" junctions are coated with a reflective material 38 (see FIG. 5). Such coatings can be applied on the surfaces at the appropriate locations as desired. Accordingly, the application of a light source to the coated surface will readily cause a differential in temperature to occur between adjacent hot and cold junctions and current will be produced in usual fashion.

Figure 6:
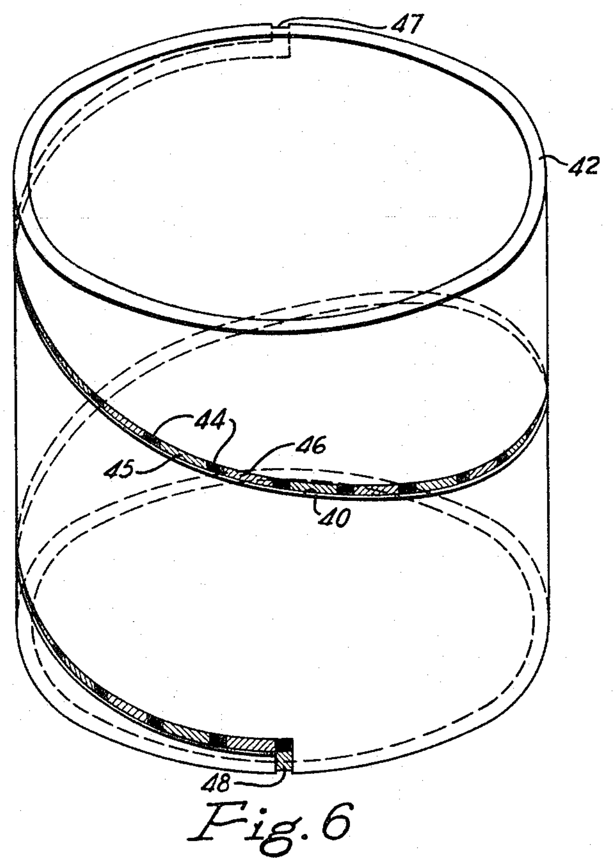
FIG. 6 shows a cylindrical device in accordance with the invention.

Another embodiment of the invention is shown in FIG. 6. A groove 40 cut in the external or internal surface of a cylindrical body 42 serves to contain the junctions 44 of the two metals 45 and 46 deposited therein. The leads for this embodiment can be taken from the top 47 and bottom 48 termini of the groove in the cylinder.

Figure 7:
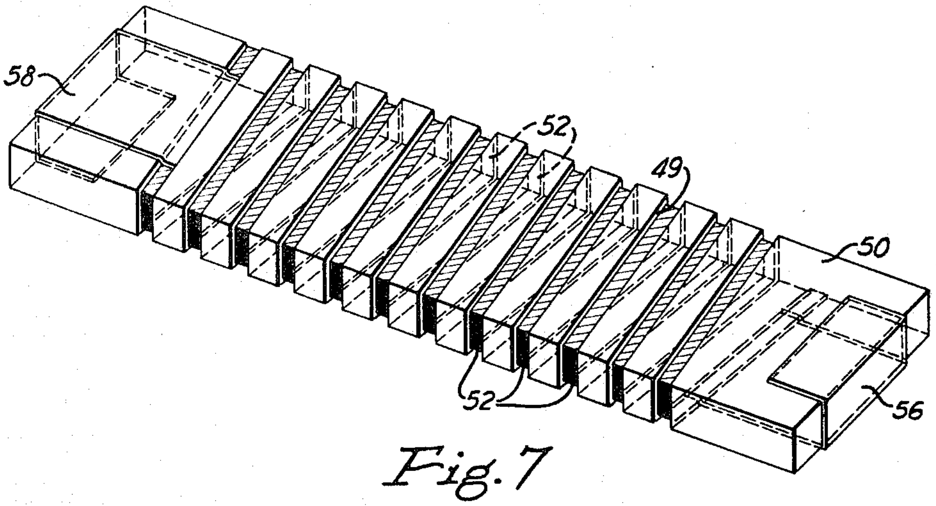
FIG. 7 shows a flat helical device of the invention.

In FIG. 7 is shown a flat helical shaped groove 49 in a substrate 50. In forming this embodiment of the invention, the first metal is deposited on a major surface and on both side edges of the substrate. Then the device is turned over, and the second metal is deposited on the other major surface and again on both side edges. Thus, the resulting thermocouples 52, where contact of the two metals occur, are in the grooves on the side edges of the device. After removing excess metal, the leads are attached to this device by applying a metal tab 56 extending from the end segment of the groove 49 on one surface and around the end edge of the substrate 50. Another metal tab 58 is attached to the end segment of the groove on the other major surface and extends around the end of substrate 50 adjacent it. Leads can then be soldered to these tabs.

The invention will be described further in conjunction with the following specific example in which the details are given by way of illustration and not by way of limitation.

A spiral pattern was provided in a ⅛ inch thick disc of acrylic plastic, approximately 4 inches in diameter, by pressing a spiral of wire into its surface by means of a heated press. The spiral wire, #14 gauge copper, resulted in a 20 turn spiral groove. The resulting groove was examined and found to be smooth, fairly regular, and spiralled from the periphery of the disc to a central area defining approximately one inch of the diameter. The excess plastic about the external loop of the spiral groove was trimmed off and a central hole ½ inch in diameter was reamed through the disc. A mask was then made of ⅛ inch thick aluminum sheet. Its form was a pattern of 12 sectors, 11 degrees wide and 19 degrees apart, radiating from a central disc approximately 1 inch in diameter and which also had a ½ inch hole reamed through it. After cleaning the acrylic plastic substrate, the aluminum mask was attached to its grooved surface by a nut and bolt so that the two parts did not move relative to one another. For purposes of strength, a 4 inch diameter aluminum disc underlaid the acrylic plastic base and additionally functioned as a heat sink. The entire assembly then was suspended in an evaporator with the exposed grooved surface of the acrylic plastic substrate about 12 inches from the evaporation source.

Bismuth was placed in an alundum crucible and the crucible, in turn, was placed in induction heating coils in a high vacuum evaporator. The evaporator was then evacuated to a pressure of $1.8\times10^{-5}$ torr. The bismuth used had been prefused earlier under high vacuum to outgas it. Heat was then applied by means of the coil, and the bismuth evaporated from the crucible and condensed on the cooler substrate surface and mask. After the evaporation of some 11.9 grams of bismuth the unit was removed from the evaporator. The mask was moved so that its sectors now covered the central portions of the previously coated areas. The unit was again placed in the evaporator and the bismuth source was replaced by a set of two helical tungsten filaments for the nichrome evaporations. A total of 80 inches of #27 gauge Nichrome wire was evaporated from these two filaments in two evaporation cycles using standard techniques. During both cycles the pressure in the evaporator was held between $2.0\times10^{-5}$ and $8.0\times10^{-5}$ torr. No attempt was made to measure or estimate source temperatures in any of the evaporation cycles. The amounts of heat applied were adjusted until satisfactory rates of evaporation or condensation were observed.

Thereafter, the unit was removed from the evaporator and mounted on a lathe. Turning the lathe at a slow speed, the coating materials were removed from the surfaces of the substrate between the grooves by a very light hand-sanding using #400 grit silicon carbide abrasive paper. Sanding was continued until visual examination failed to show conductive paths between successive turns of the spiral.

The substrate was then removed from the lathe for the application of leads. Conductive silver was painted from the ends of the groove to the back of the disc and terminated a short distance from each other. Thereafter, the surface containing the groove was coated with a clear arcylic resin mixture to seal the circuitry. After this was accomplished, a mask similar to the one used in the application of the metals, and consisting of 12 sectors, 15° wide and 15° apart, radiating from a central disc one inch in diameter, was applied to the substrate. The mask was positioned so that alternate radial strings of junctions were exposed. Then aluminum was evaporated on the exposed junctions. After removal from the evaporator, flat black paint was applied to the front surface in the sectors between the aluminous rays. These coatings provide the reflection from the cold junctions and absorption for the hot junctions that aids in securing temperature differentials.

Devices prepared in accordance with the foregoing example have been tested by projecting the light of a heat lamp on the coated circuitry. In one such test, after a period of about 30 seconds, the device showed an output of 0.2 volt. Moving the lamp closer to the surface, an output up to about 1.5 volts was obtained. Temperature measurements showed that with the 0.2 volt output, the average temperature difference between "hot" and "cold" junctions was 12.8° C. and for the 1.5 volt output, this temperature difference was 96.15°.

Other spiral thermopiles were made with a disc-shaped substrate of the dimensions given in Example I above. Using 8.5 grams of bismuth and 17.6 grams of antimony, 328 couples were applied. The groove in this substrate was made by a smaller wire than that of the above example and approximately 27 turns existed. A voltage output of 0.25 volt was obtained with a lamp spaced 15¾ inches from the thermopile.

In accordance with the foregoing description and discussion, it is evident that the present invention provides a marked improvement in thermopiles. The provision of all the thermocouples physically below the surface of the substrate carrying them insures physical protection for the junctions. The simplicity by which these materials and the resulting junctions are produced is in marked contrast with the tedious practices heretofore used. In consequence of the procedure adopted, an unusually large number of junctions, and therefore a large overall effect, can be readily obtained within a limited substrate surface.

In accordance with the provisions of the patent statutes, the principle of the invention has been stated and there has been illustrated and described what is now considered to be its best embodiment. However, it should be understood that, within the scope of the appended claim, the invention may be practiced otherwise than as specifically illustrated and described.

I claim:

A method of making a thermopile comprising providing a circular disk of an electrically and thermally insulating material having a spiral groove in one surface, applying to said surface a masking member having a plurality of segmental arms tapering outwardly from the central region of the disk, depositing a first metal upon the disk through the spaces between said arms, shifting the masking member to uncover the previously masked area of the disk and to cover the deposit of said first metal, depositing a different metal on the uncovered portion of the disk, the width of said arms being narrower than the spaces between them whereby the deposited metals overlap, removing said masking member, and removing metal from the disk that is not within said groove.

References Cited by the Examiner

UNITED STATES PATENTS

| | | | |
|---|---|---|---|
| 1,638,943 | 7/1927 | Kittle | 117—212 |
| 2,674,641 | 4/1945 | Holmes | 136—5 |

| | | | |
|---|---|---|---|
| 2,378,804 | 6/1945 | Sparrow et al. | 136—5 |
| 2,728,693 | 12/1955 | I. Cado | 117—212 |
| 2,962,393 | 11/1960 | Ruckelshaus | 117—212 |
| 3,071,495 | 1/1963 | Hanlein | 117—212 |
| 3,108,021 | 10/1963 | Stanley | 117—212 |

OTHER REFERENCES

OSRD–4415 Final Report, Massachusetts Institute of Technology Contract OEMSR–126 PB 19778, pages 18 and 22–24 relied on.

ALFRED L. LEAVITT, *Primary Examiner.*

ALLEN B. CURTIS, WILLIAM J. JARVIS, *Examiners.*